(12) United States Patent
Wang et al.

(10) Patent No.: US 11,561,013 B2
(45) Date of Patent: Jan. 24, 2023

(54) SELF-HEATING HOT POT WITH ANTI-SCALD STRUCTURE

(71) Applicant: CHANGSHA UNIVERSITY OF SCIENCE AND TECHNOLOGY, Changsha (CN)

(72) Inventors: Jianhui Wang, Changsha (CN); Yanrong Chen, Changsha (CN); Bo Zhang, Changsha (CN); Shouyao Xiong, Changsha (CN); Qijie Chen, Changsha (CN); Dongmin Liu, Changsha (CN); Fang Fang, Changsha (CN); Mingwei Mu, Changsha (CN); Yufei Xie, Changsha (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 0 days.

(21) Appl. No.: 17/586,976

(22) Filed: Jan. 28, 2022

(65) Prior Publication Data

US 2022/0252276 A1 Aug. 11, 2022

(51) Int. Cl.
*A47J 39/00* (2006.01)
*F24C 15/36* (2006.01)
(Continued)

(52) U.S. Cl.
CPC ........... *F24C 15/36* (2013.01); *A47J 36/2494* (2013.01); *A47J 41/0044* (2013.01); *A47J 41/0055* (2013.01); *F24C 9/00* (2013.01)

(58) Field of Classification Search
CPC ......... F24C 15/36; F24C 9/00; A47J 36/2494; A47J 41/0044; A47J 41/0055;
(Continued)

(56) References Cited

U.S. PATENT DOCUMENTS

| 2,837,232 A | * | 6/1958 | Rossi | ................. B65D 81/3846 |
| | | | | 215/13.1 |
| 2,895,636 A | * | 7/1959 | Martin | ............... A47G 19/2288 |
| | | | | 220/592.16 |

(Continued)

FOREIGN PATENT DOCUMENTS

| CN | 104739145 A | 7/2015 |
| CN | 204635974 U | 9/2015 |

(Continued)

*Primary Examiner* — Eric S Stapleton

(57) ABSTRACT

The present invention discloses a self-heating hot pot with an anti-scald structure and belongs to the technical field of self-heating hot pots. The self-heating hot pot includes an outer housing, an inner container box and a heating bag; a partition plate is arranged inside the inner container box, a bulge is arranged on the top of the inner container box, and the inner container box is placed on a supporting block on the inner wall of the outer housing by the bulge; an anti-scale device including baffles is arranged on a side wall of the outer housing, the two upper and lower baffles form a circle of heat insulation groove on the side wall of the outer housing, a heat expansion assembly is arranged in the heat insulation groove and is connected with an anti-scald plate.

7 Claims, 5 Drawing Sheets

(51) Int. Cl.
*A47J 36/24* (2006.01)
*A47J 41/00* (2006.01)
*F24C 9/00* (2006.01)

(58) Field of Classification Search
CPC .... A47J 36/2444; A47J 47/145; A47J 36/027; A47G 19/2288; A47G 19/027; Y10S 99/14
USPC ................ 219/730, 734; 126/261, 400, 246; 206/545; 220/215, 574.2
See application file for complete search history.

(56) References Cited

U.S. PATENT DOCUMENTS

| | | | | |
|---|---|---|---|---|
| 2,954,888 | A * | 10/1960 | Bramming | A47J 41/02 D7/608 |
| 3,115,263 | A * | 12/1963 | Leslie-Smith | A47J 41/02 215/12.1 |
| 3,145,708 | A * | 8/1964 | Fischer | A47G 19/12 D7/312 |
| 3,221,915 | A * | 12/1965 | Gort | B65D 25/14 65/153 |
| 3,258,147 | A * | 6/1966 | Rownd | A47J 41/02 215/12.1 |
| 3,476,277 | A * | 11/1969 | Rownd | A47J 41/02 D7/608 |
| 3,638,820 | A * | 2/1972 | Misu | A47J 41/022 215/12.2 |
| 3,871,543 | A * | 3/1975 | Chadfield | A45D 40/0068 215/12.1 |
| 3,970,068 | A * | 7/1976 | Sato | B65D 81/3484 62/294 |
| 4,718,566 | A * | 1/1988 | Wunder | A47G 19/127 220/592.16 |
| 4,753,085 | A * | 6/1988 | Labrousse | F25D 5/02 62/294 |
| 5,052,369 | A * | 10/1991 | Johnson | A47G 19/2288 126/246 |
| 5,243,835 | A * | 9/1993 | Padamsee | A47J 41/0044 62/530 |
| 5,355,869 | A * | 10/1994 | Pickard | F24C 9/00 126/246 |
| 5,388,565 | A * | 2/1995 | Ou | B65D 81/3484 126/262 |
| 5,544,701 | A * | 8/1996 | Elder | E03C 1/06 126/261 |
| 6,079,405 | A * | 6/2000 | Justo | A47J 36/28 126/263.08 |
| 6,108,489 | A * | 8/2000 | Frohlich | F28D 20/028 392/339 |
| 6,116,231 | A * | 9/2000 | Sabin | A61F 7/03 126/263.01 |
| 6,481,470 | B1 * | 11/2002 | Rubenic | B09B 3/00 222/5 |
| 7,722,782 | B2 * | 5/2010 | Coffey | F24V 30/00 252/70 |
| 10,850,911 | B2 * | 12/2020 | Sabin | B65D 81/3484 |
| 2007/0145044 | A1 * | 6/2007 | Ramirez | A47G 19/027 219/730 |
| 2007/0169506 | A1 * | 7/2007 | Heuschober | F25D 3/08 62/457.3 |
| 2007/0175906 | A1 * | 8/2007 | Caladrino | B65D 81/3876 220/592.16 |
| 2007/0210093 | A1 * | 9/2007 | Pinelli | B65D 43/20 220/715 |
| 2008/0000898 | A1 * | 1/2008 | Ramsden | B65D 51/28 220/521 |
| 2010/0239877 | A1 * | 9/2010 | Paul | H05B 6/06 427/591 |
| 2011/0206573 | A1 * | 8/2011 | Ackley | B01J 8/002 422/219 |
| 2014/0358206 | A1 * | 12/2014 | Hirokane | A61F 7/03 607/109 |
| 2017/0267437 | A1 * | 9/2017 | Sabin | B65D 77/048 |

FOREIGN PATENT DOCUMENTS

| | | |
|---|---|---|
| CN | 105942801 A | 9/2016 |
| CN | 105942802 A | 9/2016 |
| CN | 209106866 U | 7/2019 |
| CN | 211155104 U | 8/2020 |

* cited by examiner

SELF-HEATING HOT POT WITH ANTI-SCALD STRUCTURE

CROSS-REFERENCE TO RELATED APPLICATIONS

The application claims priority to Chinese patent application No. 202110161584.0, filed on Feb. 5, 2021, the entire contents of which are incorporated herein by reference.

TECHNICAL FIELD

The present invention relates to the technical field of self-heating hot pots, in particular to a self-heating hot pot with an anti-scald structure.

BACKGROUND

A self-heating hot pot is also called as a convenient hot pot and is a convenient food, that is, a steaming hot pot which may be enjoyed by only adding cold water and waiting for a moment. For many people who go to a tourist and camp in the field, the self-heating hot pot serves as a convenient food to be often taken.

When an existing self-heating hot pot is used, temperatures of a pot body and a food basin are both higher, which causes contact between a user and the pot body to further scald hands of the user, and thus, an anti-scald self-heating hot pot is needed to solve the above-mentioned problem. For example, the Chinese patent with the patent number CN201921601962.7 disclosed an anti-scald self-heating hot pot of which a pot body is integrally connected with a connecting rib, so that the thickness of the pot body is increased; and a person is hindered by the connecting rib, so that the person is prevented from being in direct contact with the pot body, and then, the anti-scald effect is improved.

However, the self-heating hot pot in the above-mentioned solution has no heat insulation space, and the rib is still integrally connected with the pot body, so that the temperature of the rib is still easy to rise, and the overall anti-scald effect is not good. Therefore, further improvement is still needed to further improve the user experience.

SUMMARY

The purpose of the present invention is to provide a self-heating hot pot with an anti-scald structure to solve the above-mentioned problems. A side wall of an outer housing and an anti-scald plate form the heat insulation groove, and the anti-scald plate can be supported by a heat expansion assembly to rise, so that the temperature of the anti-scald plate is not easy to rise, and then, better heat insulation and anti-scald effects are brought.

In order to achieve the above-mentioned purpose, the present invention adopts the following technical solution: A self-heating hot pot with an anti-scald structure, comprising an outer housing, an inner container box and a heating bag, the inner container box being arranged in the outer housing, and the heating bag being arranged in the outer housing, wherein a partition plate is arranged inside the inner container box, a bulge) is arranged on the top of the inner container box, and the inner container box is placed on a supporting block on the inner wall of the outer housing by the bulge; a first limiting block is arranged on an outer ring of the top of the outer housing, and a top cover of the outer housing is mounted by limitation of the first limiting block; an anti-scale device comprising baffles is arranged on a side wall of the outer housing, the two upper and lower baffles form a circle of heat insulation groove on the side wall of the outer housing, and a heat expansion assembly is arranged in the heat insulation groove and is connected with an anti-scald plate; and a second limiting block is arranged on the bottom of the outer housing.

Further, wherein the anti-scald plate is movably arranged in the heat insulation groove and is connected with the side wall of the outer housing by a connecting piece.

Further, wherein the connecting piece is an elastic element such as an elastic rope or spring.

Further, wherein the heat expansion assembly comprises a limiting post of which one end is connected to the side wall of the outer housing and the other end is provided with a limiting hole, a connecting post is movably arranged in the limiting hole, and the other end of the connecting post is connected with the anti-scald plate.

Further, wherein a heat expansion member is placed in the limiting hole of the limiting post and is limited in the limiting hole of the limiting post by one end of the connecting post;

Further, wherein the heat expansion member is a balloon, and the balloon is filled with nitrogen.

Further, wherein the top cover is provided with a first limiting plate and is inserted to a limiting groove in the first limiting block via the first limiting plate so as to be mounted by limitation.

Further, wherein the top cover is provided with a second limiting plate and can be inserted to a limiting groove in the second limiting block on the bottom of the outer housing via the second limiting plate so as to be mounted after being taken down.

Further, wherein the second limiting plate is higher than the second limiting block.

The present invention has the following beneficial effects:

1. in order to improve the heat insulation and anti-scald effects of the outer housing, the two upper and lower baffles are arranged on the outer housing to form the heat insulation groove, the anti-scald plate is connected to the inside of the heat insulation groove by the heat expansion assembly, and the width of the anti-scald plate is smaller than the height of the heat insulation groove, which ensures that the anti-scald plate can freely move in the heat insulation groove and is supported by the heat expansion assembly to rise in a heating process, so that the phenomenon that the anti-scald plate is in direct contact with the outer housing to cause the rapid rise of the temperature of the anti-scald plate is avoided, and then, a better anti-scald effect is achieved;

2. meanwhile, the top cover in the present invention can be dismounted to be mounted on the bottom of the outer housing to achieve an anti-scald effect realized by thickening the bottom, wherein the second limiting plate is higher than the second limiting block, so that the top cover and a bottom plate of the outer housing form a higher cavity for heat insulation, and then, a better bottom heat insulation effect is achieved; and 3. the heat expansion member of the heat expansion assembly in the present invention is limited by the limiting post, so that the heat expansion member can only expand and extend to the outer side to push the connecting post to move outwards and further drive the anti-scald plate to rise; and the anti-scald plate is connected with the outer housing by an elastic connecting piece, when not being heated and being in a cooled state, the anti-scald plate is tensioned by the connecting piece and is limited by the limiting post, so that the anti-scald plate is higher in stability and convenient to hold.

DETAILED DESCRIPTION OF THE EMBODIMENTS

Figure 1:
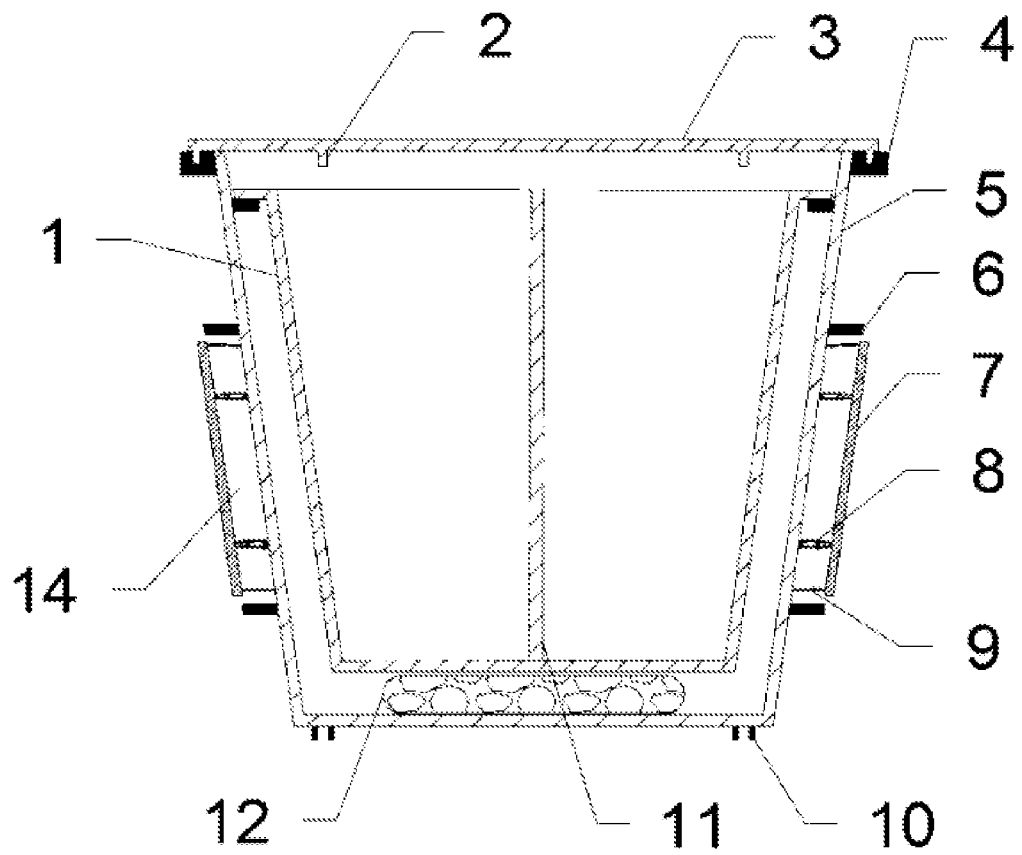
FIG. 1 is a schematic diagram showing an overall structure in the present invention.

The present invention will be further described below in conjunction with embodiments.

A self-heating hot pot with an anti-scald structure, comprising an outer housing (5), an inner container box (1) and a heating bag (12), the inner container box (1) being arranged in the outer housing (5), and the heating bag (12) being arranged in the outer housing (5), wherein a partition plate (11) is arranged inside the inner container box (1), a bulge (16) is arranged on the top of the inner container box (1), and the inner container box (1) is placed on a supporting block (15) on the inner wall of the outer housing (5) by the bulge (16); a first limiting block (4) is arranged on an outer ring of the top of the outer housing (5), and a top cover (3) of the outer housing (5) is mounted by limitation of the first limiting block (4); an anti-scald device comprising baffles (6) is arranged on a side wall of the outer housing (5), the two upper and lower baffles form a circle of heat insulation groove (14) on the side wall of the outer housing (5), and a heat expansion assembly (8) is arranged in the heat insulation groove (14) and is connected with an anti-scald plate (7); and a second limiting block (10) is arranged on the bottom of the outer housing (5).

Figure 5:
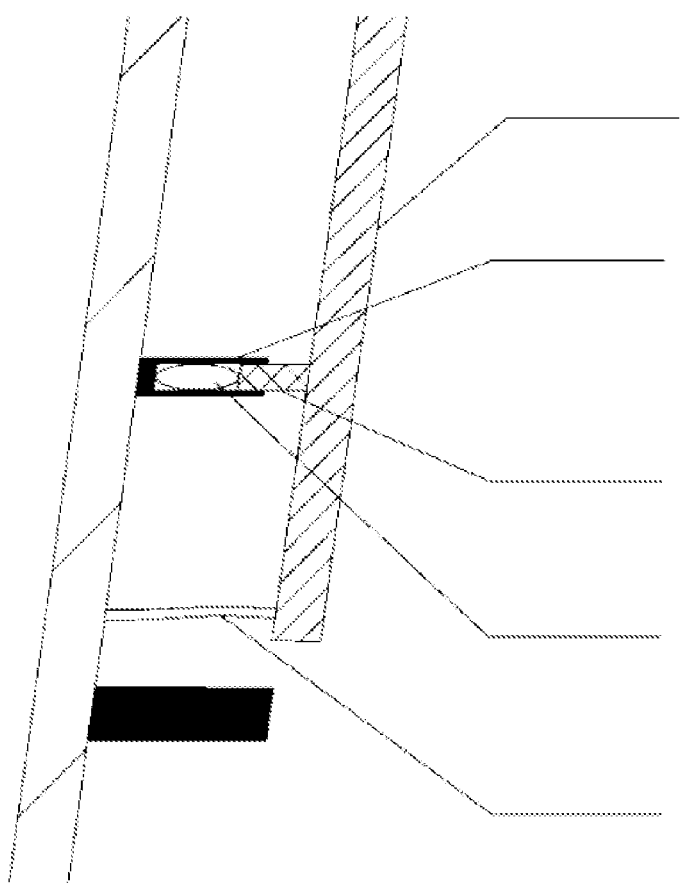
FIG. 5 is a schematic diagram showing a structure of a heat expansion assembly in the present invention.

Preferably, reference is made to FIG. 1 and FIG. 5, an anti-scald plate 7 is movably arranged in a heat insulation groove 14 and is connected with a side wall of an outer housing 5 by a connecting piece 9.

Preferably, reference is made to FIG. 1 and FIG. 5, the connecting piece (9) is an elastic element such as an elastic rope or spring.

Preferably, reference is made to FIG. 5, the heat expansion assembly (8) comprises a limiting post (801) of which one end is connected to the side wall of the outer housing (5) and the other end is provided with a limiting hole, a connecting post (802) is movably arranged in the limiting hole, and the other end of the connecting post (802) is connected with the anti-scald plate (7).

Preferably, reference is made to FIG. 5, a heat expansion member (803) is placed in the limiting hole of the limiting post (801) and is limited in the limiting hole of the limiting post (801) by one end of the connecting post (802).

Preferably, reference is made to FIG. 5, the heat expansion member (803) is a balloon, and the balloon is filled with nitrogen.

Figure 2:
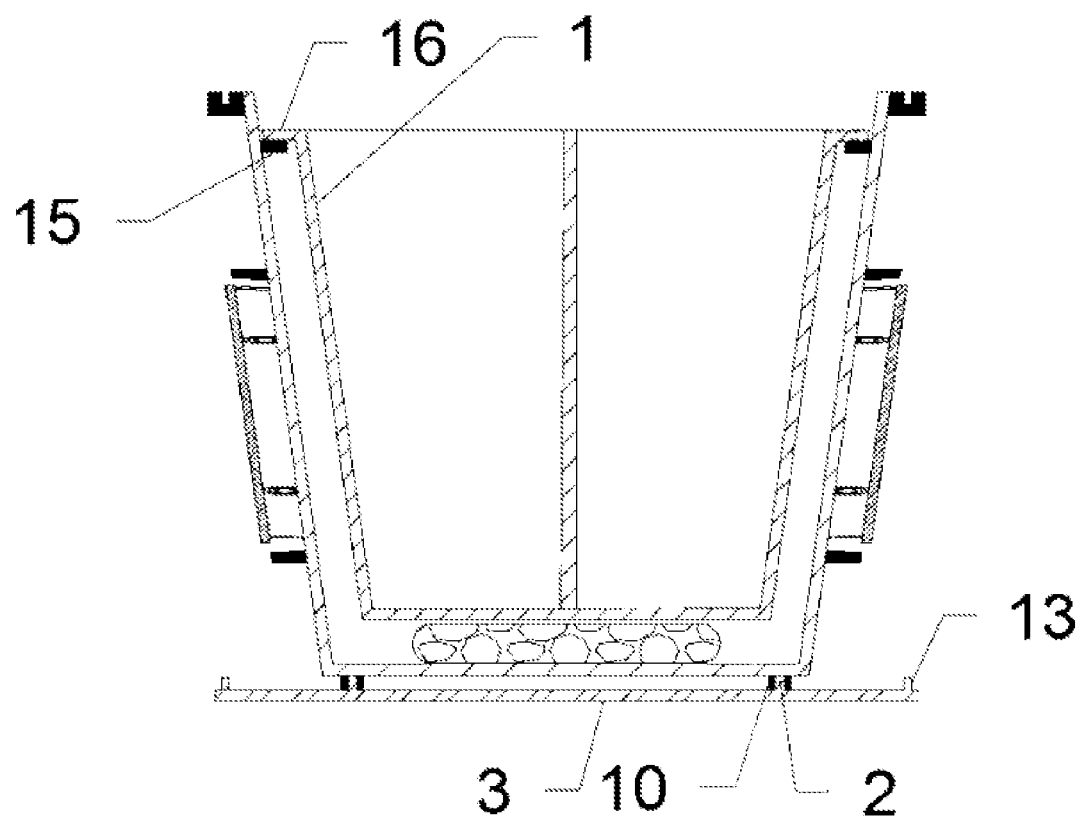
FIG. 2 is a schematic diagram showing that a top cover is mounted on the bottom of an outer housing in the present invention.

Preferably, reference is made to FIG. 1 and FIG. 2, the top cover (3) is provided with a first limiting plate (2) and is inserted to a limiting groove in the first limiting block (4) via the first limiting plate (2) so as to be mounted by limitation.

Figure 3:
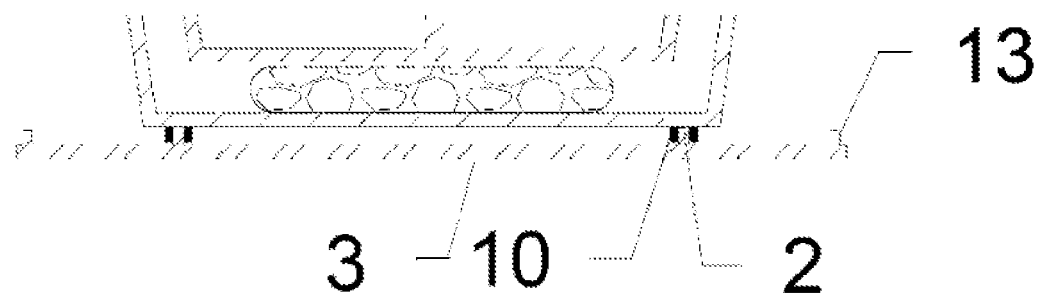
FIG. 3 is a schematic diagram showing a height difference of a second limiting plate and a second limiting block in the present invention.
Figure 4:
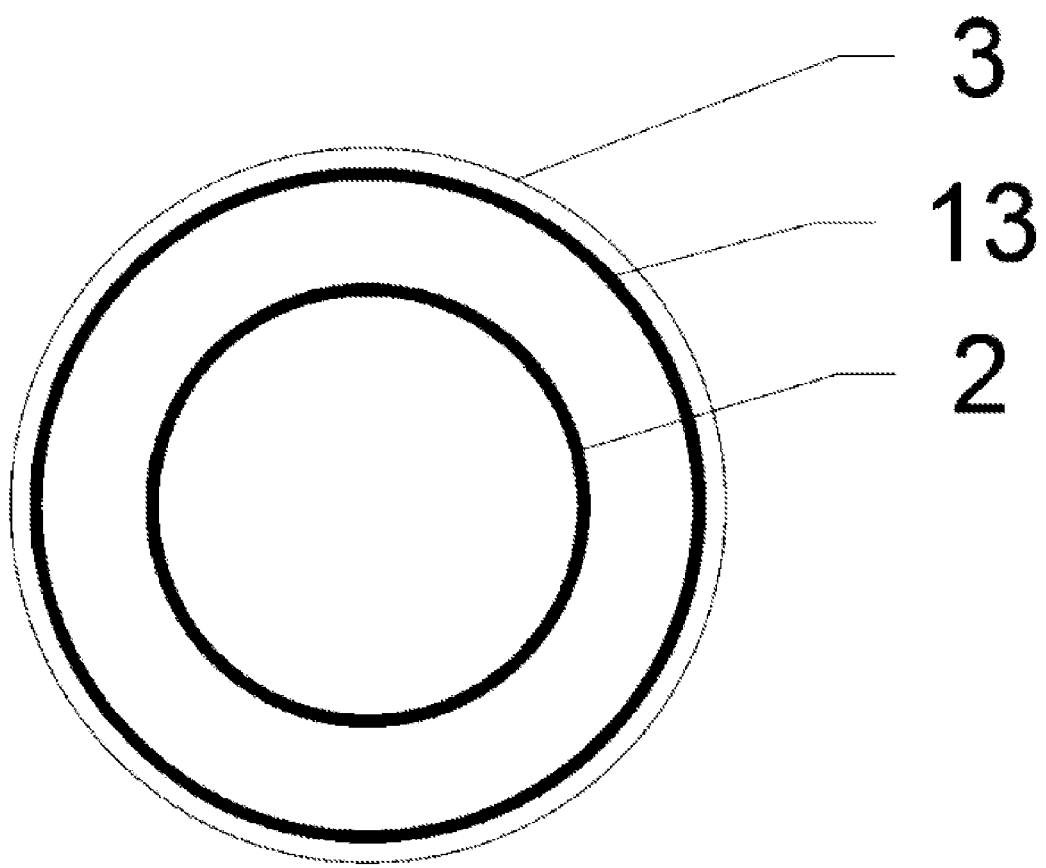
FIG. 4 is a bottom schematic diagram of the top cover in the present invention.

Preferably, reference is made to FIG. 2 and FIG. 3, the top cover (3) is provided with a second limiting plate (13) and can be inserted to a limiting groove in the second limiting block (10) on the bottom of the outer housing (5) via the second limiting plate (13) so as to be mounted after being taken down.

Preferably, reference is made to FIG. 2 and FIG. 3, the second limiting plate (13) is higher than the second limiting block (10).

What is claimed is:

1. A self-heating hot pot with an anti-scald structure, comprising:

an outer housing (5), an inner container box (1) and a heating bag (12), the inner container box (1) being arranged in the outer housing (5), and a heating bag (12) being arranged in the outer housing (5), wherein a partition plate (11) is arranged inside the inner container box (1), a bulge (16) is arranged on top of the inner container box (1), and the inner container box (1) is placed on a supporting block (15) on an inner wall of an outer housing (5) by the bulge (16); a first limiting block (4) is arranged on an outer ring of top of the outer housing (5), and a top cover (3) of the outer housing (5) is mounted by limitation of a first limiting block (4);

an anti-scale device comprising baffles (6) is arranged on a side wall of the outer housing (5), an upper and a lower baffles form a circle of heat insulation groove (14) on the side wall of the outer housing (5), and a heat expansion assembly (8) is arranged in the heat insulation groove (14) and is connected with an anti-scald plate (7); the heat expansion assembly (8) comprises a limiting post (801) of which one end is connected to the side wall of the outer housing (5) and the other end is provided with a limiting hole, a connecting post (802) is movably arranged in the limiting hole, and the other end of the connecting post (802) is connected with the anti-scald plate (7); a heat expansion member (803) is placed in the limiting hole of the limiting post (801) and is limited in the limiting hole of the limiting post (801) by one end of the connecting post (802); and a second limiting block (10) is arranged on the bottom of the outer housing (5).

2. The self-heating hot pot with the anti-scald structure of claim 1, wherein the anti-scald plate (7) is movably arranged in the heat insulation groove (14) and is connected with the side wall of the outer housing (5) by a connecting piece (9).

3. The self-heating hot pot with the anti-scald structure of claim 2, wherein the connecting piece (9) is an elastic element.

4. The self-heating hot pot with the anti-scald structure of claim 1, wherein the heat expansion member (803) is a balloon, and the balloon is filled with nitrogen.

5. The self-heating hot pot with the anti-scald structure of claim 1, wherein the top cover (3) is provided with a first limiting plate (2) and is inserted to a limiting groove in the first limiting block (4) via the first limiting plate (2).

6. The self-heating hot pot with the anti-scald structure of claim 1, wherein the top cover (3) is provided with a second limiting plate (13) and can be inserted to a limiting groove in the second limiting block (10) on the bottom of the outer housing (5) via the second limiting plate (13).

7. The self-heating hot pot with the anti-scald structure of claim 6, wherein the second limiting plate (13) is higher than the second limiting block (10).

* * * * *